US010105775B2

(12) United States Patent
Nakata et al.

(10) Patent No.: US 10,105,775 B2
(45) Date of Patent: Oct. 23, 2018

(54) CUTTING TIP, CUTTING TOOL AND GEAR EDGE CUT-OFF DEVICE

(71) Applicant: KREUZ CO., LTD., Kariya-shi, Aichi-ken (JP)

(72) Inventors: Syuichi Nakata, Kariya (JP); Yuki Yamauchi, Nagoya (JP)

(73) Assignee: KREUZ CO., LTD., Kariya-shi (JP)

( * ) Notice: Subject to any disclaimer, the term of this patent is extended or adjusted under 35 U.S.C. 154(b) by 1 day.

(21) Appl. No.: 15/622,776

(22) Filed: Jun. 14, 2017

(65) Prior Publication Data

US 2017/0368624 A1    Dec. 28, 2017

(30) Foreign Application Priority Data

Jun. 23, 2016    (JP) ................. 2016-124206

(51) Int. Cl.
*B23F 19/06*    (2006.01)
*B23F 19/10*    (2006.01)
(Continued)

(52) U.S. Cl.
CPC .............. *B23F 19/10* (2013.01); *B23F 21/00* (2013.01); *B23B 1/00* (2013.01); *B23F 19/066* (2013.01); *B23F 19/101* (2013.01); *B23F 21/043* (2013.01)

(58) Field of Classification Search
CPC . Y10T 409/101113; Y10T 409/101272; B23F 19/06; B23F 19/066; B23F 19/10;
(Continued)

(56) References Cited

U.S. PATENT DOCUMENTS 2,135,819 A * 11/1938 Klix ................... B23F 21/00
407/20
2,347,890 A *  5/1944 Dath .................. B61G 9/025
213/62 A
(Continued)

FOREIGN PATENT DOCUMENTS

EP        1022082       7/2000
FR        1092442 A     4/1955
(Continued)

OTHER PUBLICATIONS

U.S. Appl. No. 15/339,479, filed Oct. 31, 2016 in the name of Syuichi Nakata.

*Primary Examiner* — Daniel Howell
*Assistant Examiner* — Yasir Diab
(74) *Attorney, Agent, or Firm* — Oliff PLC

(57) ABSTRACT

A cutting tip, a cutting tool and a gear edge cut-off device have greater ease-of-use than the conventional art. The cutting tip has a shaft portion supported linearly movably and forwardly biased in a linearly moving direction, an angular base portion provided at a front end of the shaft portion and having a pair of skirt faces and a ridge portion that extends obliquely with respect to the linearly moving direction, a groove depressed near the ridge portion of the skirt face, a blade edge on the cutting blade, positioned on a border line between the ridge portion and the groove, a rake face provided on the cutting blade and positioned further toward the groove side than the blade edge, and a flank face positioned further toward the ridge portion side than the blade edge and jutting out in the forward direction as it retracts from the blade edge.

20 Claims, 18 Drawing Sheets

(51) Int. Cl.
    *B23F 21/00*    (2006.01)
    *B23F 21/04*    (2006.01)
    *B23B 1/00*    (2006.01)

(58) Field of Classification Search
    CPC ...... B23F 19/101; B23F 21/04; B23F 21/043; B23F 21/046
    See application file for complete search history.

(56) References Cited

U.S. PATENT DOCUMENTS

| | | | | |
|---|---|---|---|---|
| 3,083,616 | A * | 4/1963 | Male | B23F 19/101 |
| | | | | 409/8 |
| 3,426,485 | A * | 2/1969 | Yamaoka | B23F 19/12 |
| | | | | 409/9 |
| 4,060,881 | A * | 12/1977 | Ryan | B23F 21/226 |
| | | | | 407/22 |
| 4,197,038 | A * | 4/1980 | Hipp | B23F 21/226 |
| | | | | 407/22 |
| 4,548,531 | A | 10/1985 | Seitelman et al. | |
| 4,662,804 | A * | 5/1987 | Tokita | B23F 19/105 |
| | | | | 409/8 |
| 5,374,142 | A * | 12/1994 | Masseth | B23F 21/226 |
| | | | | 407/113 |
| 5,934,841 | A * | 8/1999 | Rutschke | B23F 21/226 |
| | | | | 407/20 |
| 2003/0049084 | A1* | 3/2003 | Bradfield | B23F 21/236 |
| | | | | 409/12 |
| 2015/0290725 | A1* | 10/2015 | Stadtfeld | B23F 21/126 |
| | | | | 407/44 |

FOREIGN PATENT DOCUMENTS

| | | | |
|---|---|---|---|
| GB | 171899 A | * | 12/1921 |
| JP | S41-014067 | | 6/1966 |
| JP | S41-104067 Y | | 6/1966 |
| JP | S64-38223 U | | 3/1989 |
| JP | H10-180542 A | | 7/1998 |
| JP | 2002-283140 A | | 10/2002 |
| JP | 2012-206226 A | | 10/2012 |
| JP | 5550187 B2 | | 7/2014 |

* cited by examiner

CUTTING TIP, CUTTING TOOL AND GEAR EDGE CUT-OFF DEVICE

BACKGROUND OF THE INVENTION

Field of the Invention

The present invention relates to a cutting tip that cuts off the edges of gear teeth, a cutting tool for mounting the cutting tip on a lathe, and a gear edge cut-off device including the cutting tip.

Description of the Related Art

Conventionally, cutting tools of a type that have a plate-shaped cutting tip integrally formed on the tip end of a shaft portion, forming a substantial T-shape overall, are known (see Patent Document 1, for example).

RELATED ART DOCUMENTS

Patent Documents

[Patent Document 1] Japanese Patent No. 5550187 (paragraph [0036], FIG. 7)

SUMMARY OF THE INVENTION

Problems to be Solved by the Invention

The conventional cutting tool described above, however, has been problematic due to its poor ease-of-use.

The present invention has Peen made in view of the above-described circumstances, and it is an object to provide a cutting tip, a cutting tool and a gear edge cut-off device with greater ease-of-use than the conventional one.

Means of Solving the Problems

A cutting tip of the present invention made to attain the aforementioned object is a cutting tip having a cutting blade that advances and retracts between adjacent teeth of a gear in a direction of a tooth width, and is contacted in an obliquely crossing state to side edges of the teeth as viewed in a direction of a tooth thickness, wherein relative movement in the direction of the tooth thickness causes retraction from between the teeth while the side edges are cut off, the cutting tip having a shaft portion supported linearly movably and forwardly biased in a linearly moving direction, an angular base portion provided at a front end of the shaft portion and having a pair of skirt faces that are mutually separated toward the rear and a ridge portion that extends obliquely with respect to the linearly moving direction, a groove depressed near a ridge portion of a skirt face and extending substantially parallel to the ridge portion, a blade edge provided on the cutting blade and positioned on a border line between the ridge portion and the groove, a rake face provided on the cutting blade and positioned further toward the groove side than the blade edge, and a flank face provided on the cutting blade and positioned further toward the ridge portion side than the blade edge, that juts out forward as it separates from the blade edge.

DESCRIPTION OF THE EMBODIMENTS

First Embodiment

Figure 1:
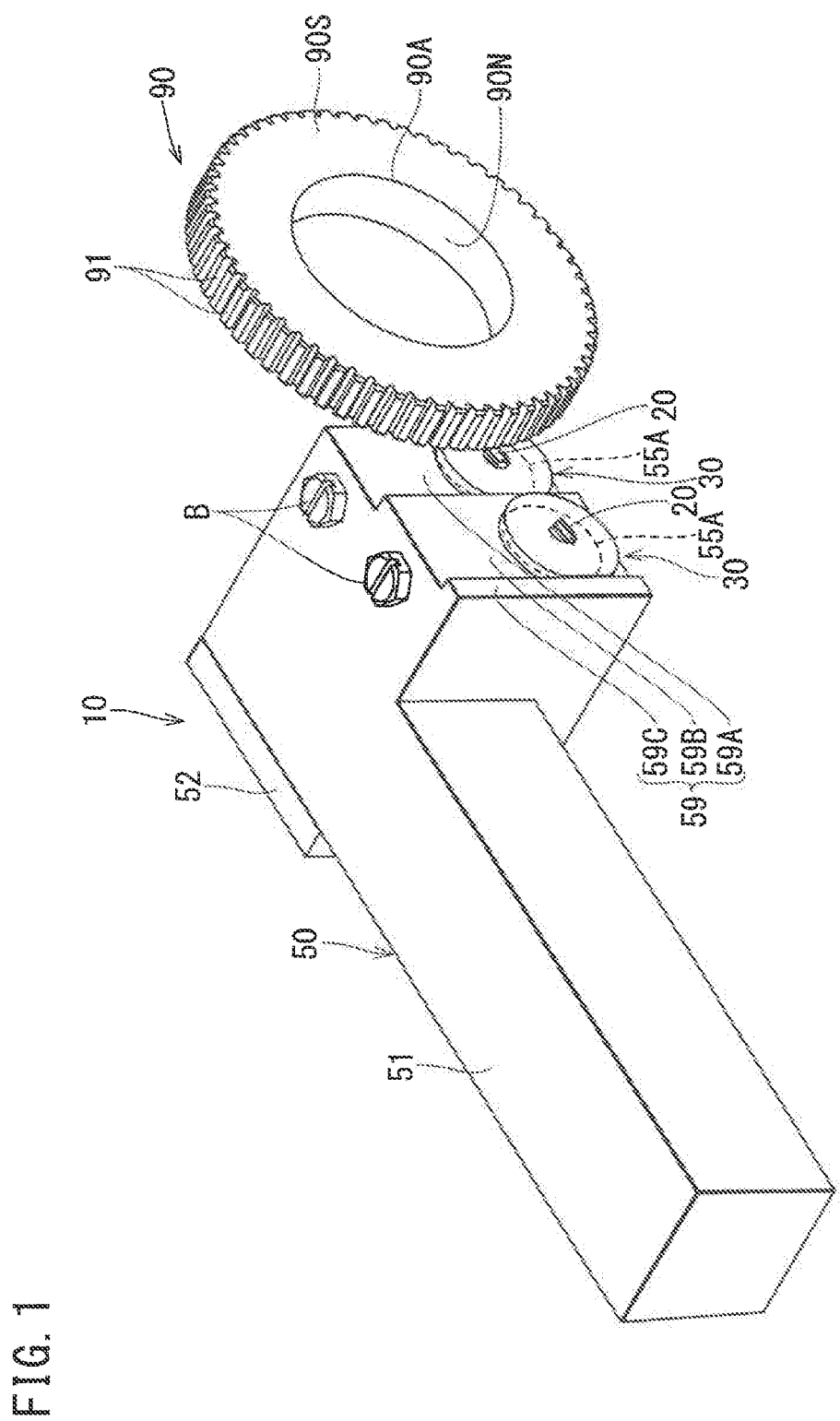
FIG. 1 is a perspective view of a cutting tool and a gear according to a first embodiment of the present invention.

One embodiment of the present invention will now be explained based on FIG. 1 to FIG. 12. FIG. 1 shows a cutting tool 10 according to the embodiment, and a toothed wheel 90 as an example of a gear to be machined by the cutting tool 10.

Figure 2:
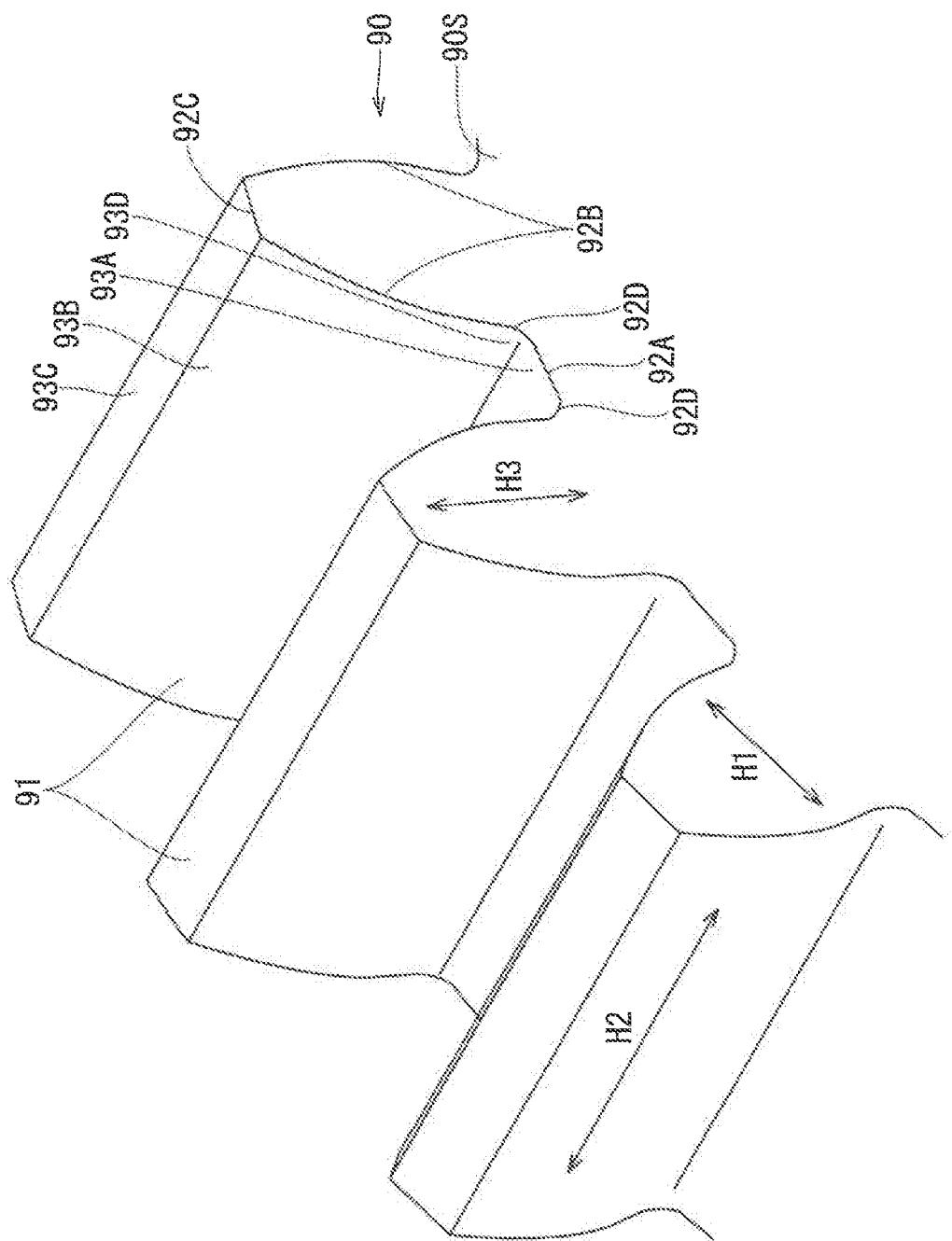
FIG. 2 is an enlarged perspective view of part of the gear.

The toothed wheel 90 is an involute gear, having, for example, a plurality of teeth 91 on an outer peripheral surface, wherein gear side surfaces 90S, 90S at both ends in an axial direction (only one gear side surface 90S being shown in FIG. 1) are flat surfaces. Also, as enlargedly shown in FIG. 2, meshing surfaces 93B of the teeth 91 are involute curved surfaces, bulging in a direction of a tooth thickness H1. In addition, an inner peripheral surface 90N of the toothed wheel 90 (see FIG. 1), bottom surfaces 93A and addendum surfaces 93C form concentric circles. Corner curved surfaces 93D, 93D formed between the bottom surfaces 93A and meshing surfaces 93B are contiguous therewith. In FIG. 2, the direction of a tooth width is indicated as "H2," and the direction of a tooth height is indicated as "H3."

The toothed wheel 90 also has top edges 92C where the gear side surfaces 90S and the addendum surfaces 93C cross, side edges 92B where the gear side surfaces 90S and the meshing surfaces 93B cross, bottom edges 92A where the gear side surfaces 90S and the bottom surfaces 93A cross, corner edges 92D where the gear side surfaces 90S and the corner curved surfaces 93D cross, and an inner edge 90A (see FIG. 1) where the gear side surface 90S and the inner peripheral surface 90N cross. The cutting tool 10 is used to remove the side edges 92B and bottom edges 92A, and the corner edges 92D between them. The other edges (the top edges 92C and the inner edges 90A) are removed by a different tool which is not shown.

As shown in FIG. 1, the cutting tool 10 has a pair of cutting tips 20, 20 mounted on a tip holder 50. The tip holder 50 includes a support block 59 at a tip end portion of a square bar portion 51. The support block 59 protrudes downward and to one side of the square bar portion 51, that side being formed as a first level 59A, a second level 59B, and a third level 59C from the tip end of the square bar portion 51, with an increasing degree of protrusion in a step-wise manner. The first level 59A and second level 59B are formed to have the same width, while the width of the third level 59C is narrower than them.

Figure 3:
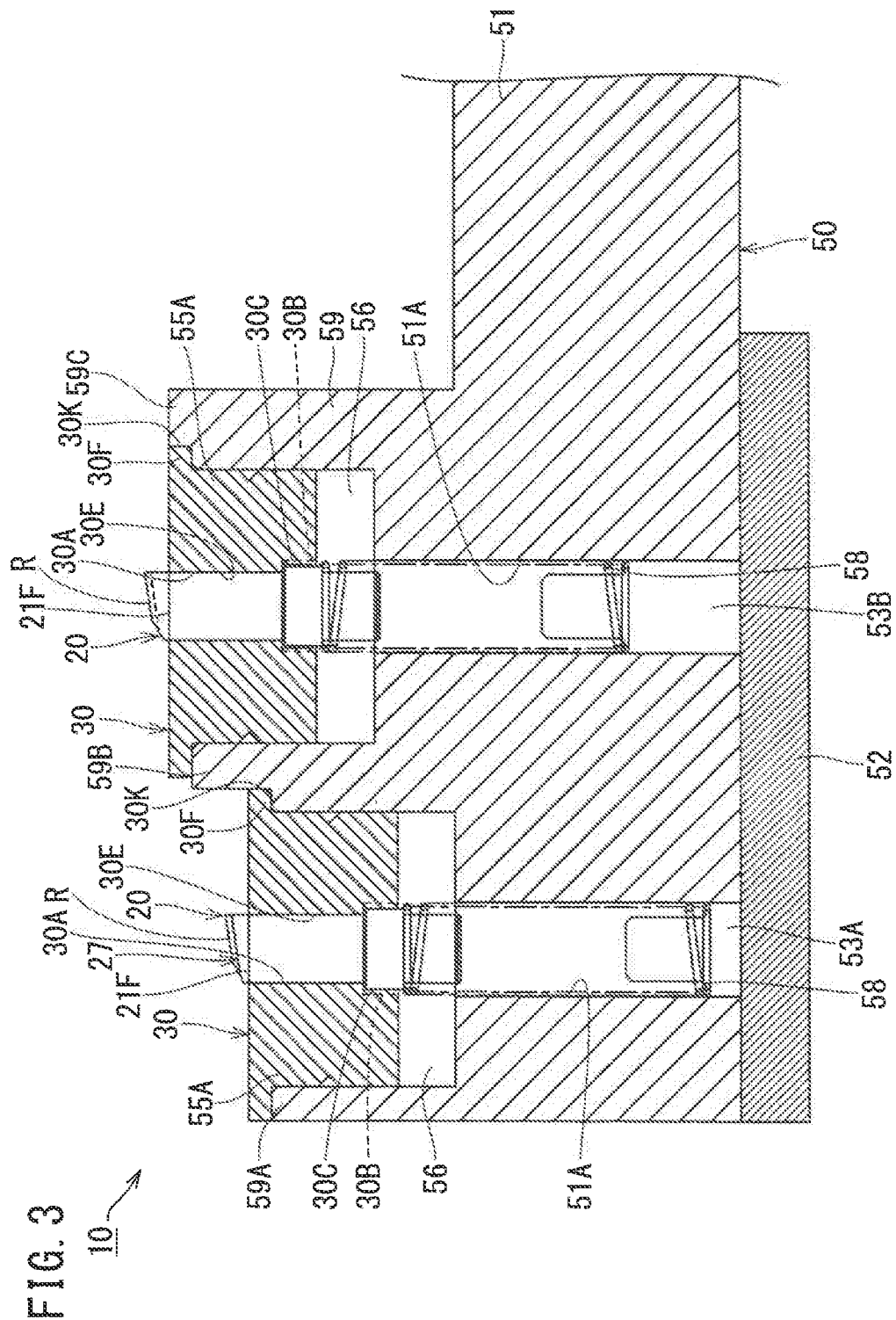
FIG. 3 is a side cross-sectional view of the cutting tool.

As shown in FIG. 3, the first level 59A and second level 59B have fitting holes 55A, 55A bored from one side, with spring housing holes 51A, 51A being formed running through from the centers of the innermost faces of the fitting holes 55A, 55A to a surface of the square bar portion 51 that is opposite against the support block 59. The fitting holes 55A, 55A are disposed at positions near a bottom end of the support block 59 (see FIG. 1).

As shown in FIG. 3, each fitting hole 55A is fitted with a guide plug 30. The guide plug 30 has a shape in which a flange 30F bulges outward from one end to a side of a circular column. The flange 30F contacts the opening edge of a spring housing hole 51A, forming mobile chambers 56 between each of the guide plugs 30 and the innermost faces of each of the fitting holes 55A. A portion of an outer edge section of each flange 30F is cut to form a positioning flat surface 30K. The positioning flat surface 30K is adjacent to the step surface between the first level 59A and the second level 59B or the step surface between the second level 59B and the third level 59C, so that the guide plug 30 is positioned in the fitting hole 55A. In addition, on the first level 59A and the second level 59B there are formed female screw holes (not shown) from a top surface across the fitting holes 55A, 55A, tip ends of bolts B, B (see FIG. 1) screwed into the female screw holes being thrust against side surfaces of guide plugs 30, 30 and the guide plugs 30, 30 thus being locked to the fitting holes 55A, 55A.

Support holes 30A are formed running through the center sections of the guide plugs 30. The support holes 30A have a small-diameter section 30E with substantially the same diameter as a shaft portion 21 of the cutting tip 20, described below, and a large groove 30B provided at a position close to the mobile chamber 56 and formed to have substantially the same width as a large-diameter shaft portion 22 of the cutting tip 20, and expanded in a step-like manner with respect to the small diameter section 30E. Inner peripheral surfaces of a large groove 30B that are opposed in a horizontal direction are positioning flat surfaces 30C, 30C. Also, a blocking plate 52 is affixed over a side of the square bar portion 51 opposite the support block 59, and spring support protrusions 53A, 53B protruding from the blocking plate 52 project into the spring housing holes 51A, 51A. Each of the spring support protrusions 53A, 53B has a tip end portion reduced in diameter in a step-like manner.

Figure 4:
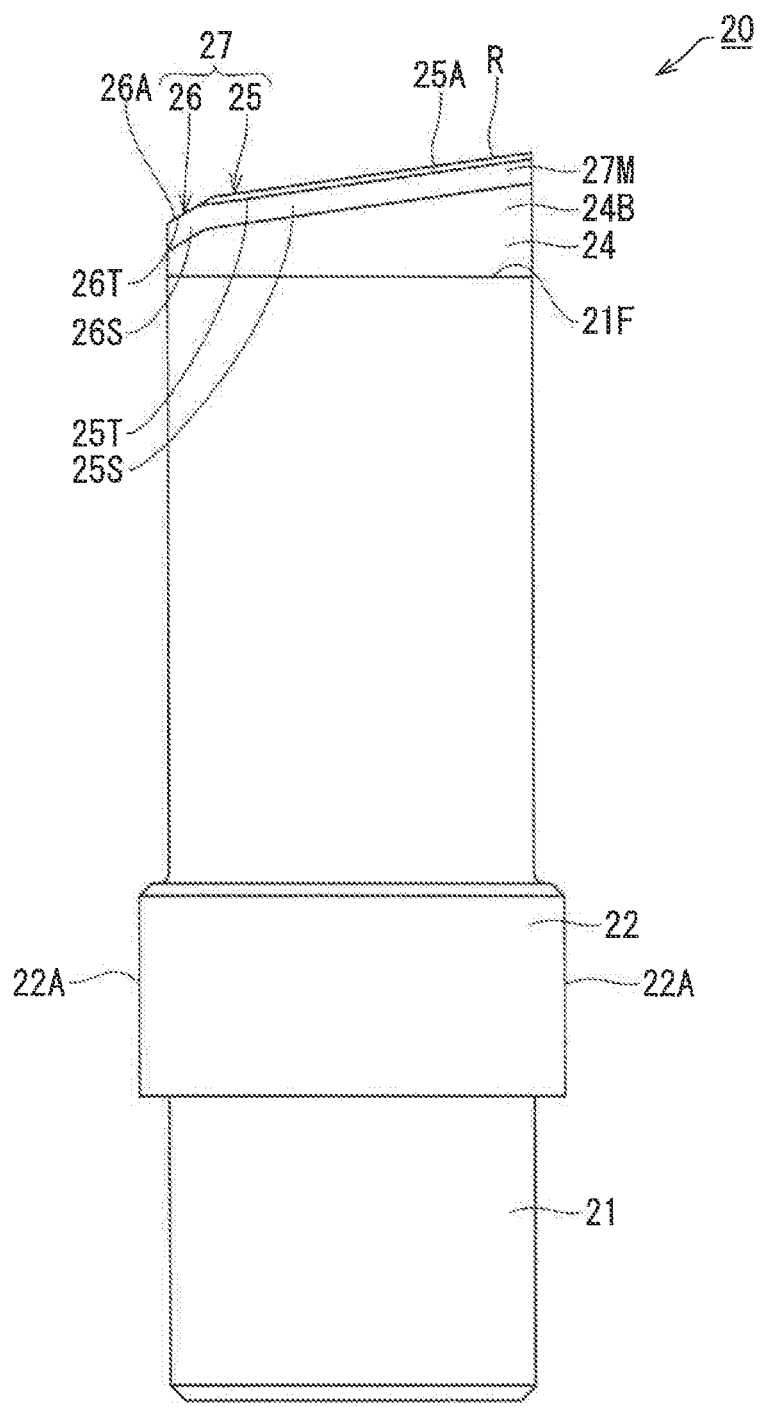
FIG. 4 is a side view of a cutting tip.

As shown in FIG. 4, the cutting tip 20 includes a blade section 27 at one end of the shaft portion 21. A side of the cutting tip 20 on which the blade section 27 is provided will hereunder be referred to as a "front side" or a "front end," and an opposite side will be referred to as a "back side" or a "back end."

The shaft portion 21 has a circular cross-section, and is provided with the large-diameter shaft portion 22 having an enlarged diameter in a step-like manner with respect to the whole shaft portion 21, at a position near the back end. As shown in FIG. 5(B), the large-diameter shaft portion 22 is cut at positions separated 180° in a circumferential direction, forming a pair of positioning flat surfaces 22A, 22A. Also, as shown in FIG. 3, a part of the shaft portion 21 further to the front than the large-diameter shaft portion 22 fits into the small-diameter section 30E of the support hole 30A, while the large-diameter shaft portion 22 of the shaft portion 21 fits into the large groove 30B of the support hole 30A, and the positioning flat surfaces 22A, 22A of the large-diameter shaft portion 22 and the positioning flat surfaces 30C, 30C of the large groove 30B are opposed to each other. This causes each cutting tip 20 to be supported linearly movably and unrotatably with respect to the guide plug 30.

Also, one end of a compression coil spring 58 is fitted at the portion of the shaft portion 21 further toward the back side than the large-diameter shaft portion 22, while the other end of the compression coil spring 58 is fitted onto a reduced-diameter portion of a tip end of the spring support protrusion 53A, mentioned above. This causes the cutting tip 20 to be forwardly biased. In addition, a front side step surface of the large-diameter shaft portion 22 of the shaft portion 21 contacts the step surface of the small-diameter section 30E and the large groove 30B, positioning the cutting tip 20 in an "origin position" in a linearly moving direction. The compression coil spring 58 corresponds to a "biasing means" of the present invention.

Figure 5A:
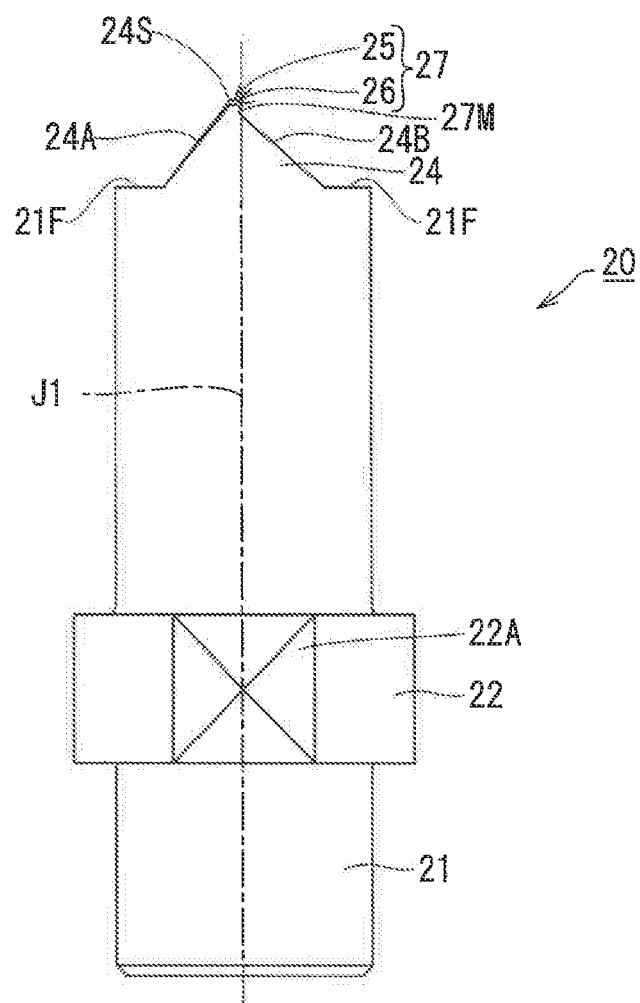
FIG. 5(A) is a side view of the cutting tip.
Figure 5B:
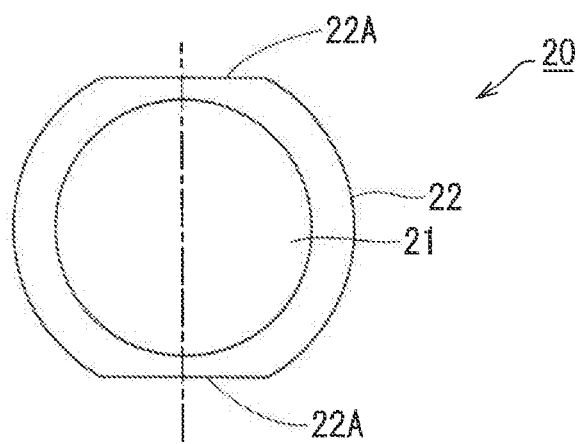
FIG. 5(B) is a bottom view of the cutting tip.

As shown in FIG. 5(A), a front end surface 21F perpendicular to the axial direction of the shaft portion 21 is provided at a front end of the cutting tip 20, an angular base portion 24 protruding from the front end surface 21F. The angular base portion 24 has skirt faces 24A, 24B that are oblique at approximately the same angle (for example, 45°) with respect to an axial direction of a central axis J1 of the shaft portion 21. Each end of the skirt faces 24A, 24B are connected to the front end surfaces 21F, 21F mentioned above. Also, as shown in FIG. 3, the front end surfaces 21F become substantially flush with outer faces of the guide plugs 30 by positioning the cutting tip 20 at the origin position. The structure may also be such that a step is provided between the front end surfaces 21F and the outer faces of the guide plugs 30.

Both of the cutting tips 20, 20 have, in an areas near the ridge portions 24S of the angular base portions 24, grooves 27M, 27M depressed in the skirt faces 24B substantially parallel to the ridge portions 24S, and the border lines between the ridge portions 24S, 24S and the grooves 27M, 27M constitute the blade sections 27, 27. The blade sections 27, 27 of both of the cutting tips 20, 20 have mutually symmetrical shapes. A blade tip of the blade section 27 of one cutting 20 mounted on the first level 59A of the tip holder 50 (see FIG. 1) faces upward, while the blade tip of the blade section 27 of the other cutting tip 20 mounted on the second level 59B (see FIG. 1) faces downward. The shape of the one cutting tip 20 with the blade tip of the blade section 27 facing upward will now be described in detail, as a representative of the both cutting tips 20, 20.

Figure 6:
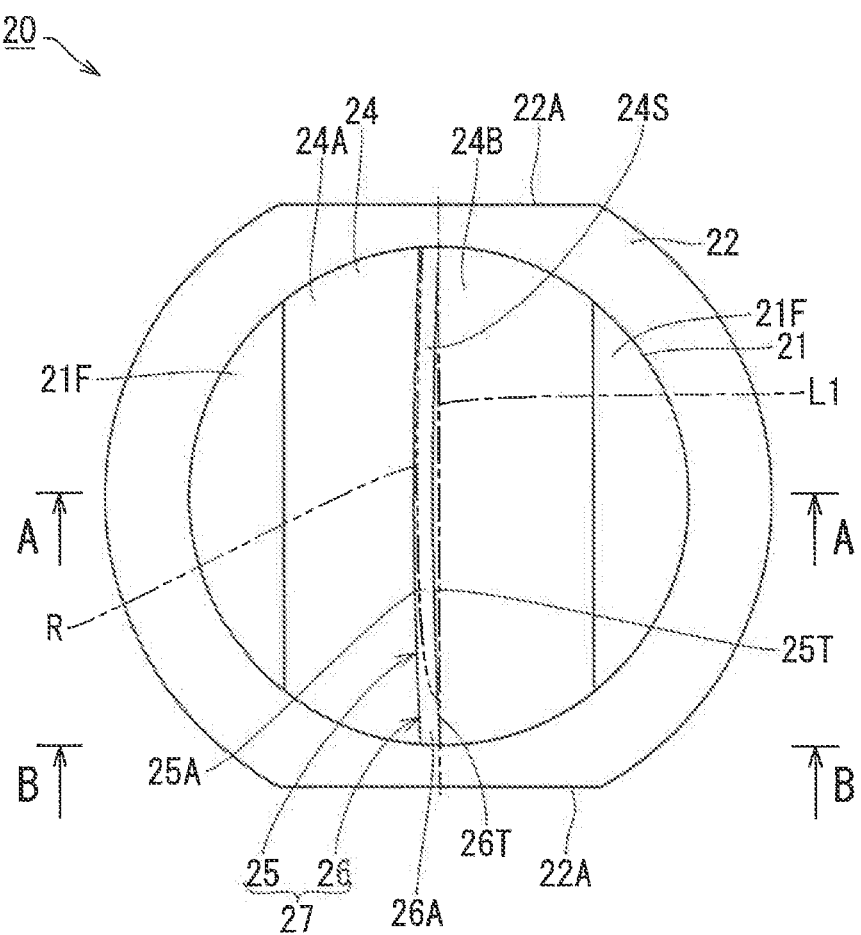
FIG. 6 is a plan view of the cutting tip.

FIG. 6 shows a planar shape of the one cutting tip 20. As shown in this diagram, an edge line R of the angular base portion 24 (a line connecting the apices of the angular base portion 24) extends in an opposing direction of the positioning flat surfaces 22A, 22A of the shaft portion 21, running through a position slightly shifted from a center of the shaft portion 21 to one skirt face 24A, the entire edge line R forming a curved shape bulging slightly toward the one skirt face 24A. In FIG. 6, a reference line L1 running through the center of the shaft portion 21 and extending in a radial direction is shown as a dash-dot line and the edge line R is shown as a two-dot-dash line.

Also, as shown in FIG. 3, the edge line R is inclined from the tip end in a longitudinal direction of the square bar portion 51, toward a base end (from left to right in FIG. 3), jutting out in a forward direction. The inclination angle of the edge line R has a sharper slope between one end of the angular base portion 24 where a degree of projection from the front end surface 21F is smaller and the position close to the one end, compared to the other portions (see FIG. 4).

As shown in FIG. 5, the cutting tip 20 has, on the skirt face 24B near the ridge portion 24S of the angular base portion 24, a groove 27M depressedly formed that is substantially parallel to the ridge portion 24S, a bottom edge cutting blade being formed at a sharp sloped portion of the edge line R, and a side edge cutting blade 25 being formed at the other portions. Also, as shown in FIG. 6, a blade edge 26T of the bottom edge cutting blade 26 and a blade edge 25T of the side edge cutting blade 25 extend contiguously in the opposing direction of the positioning flat surfaces 22A, 22A, similarly to the edge line R of the angular base portion 24, while curving into a recessed state as seen from a front side of the shaft portion 21. The side edge cutting blade 25 corresponds to the "cutting blade" of the present invention, while the bottom edge cutting blade 26 corresponds to a "bottom cutting blade" of the present invention.

Figure 7:
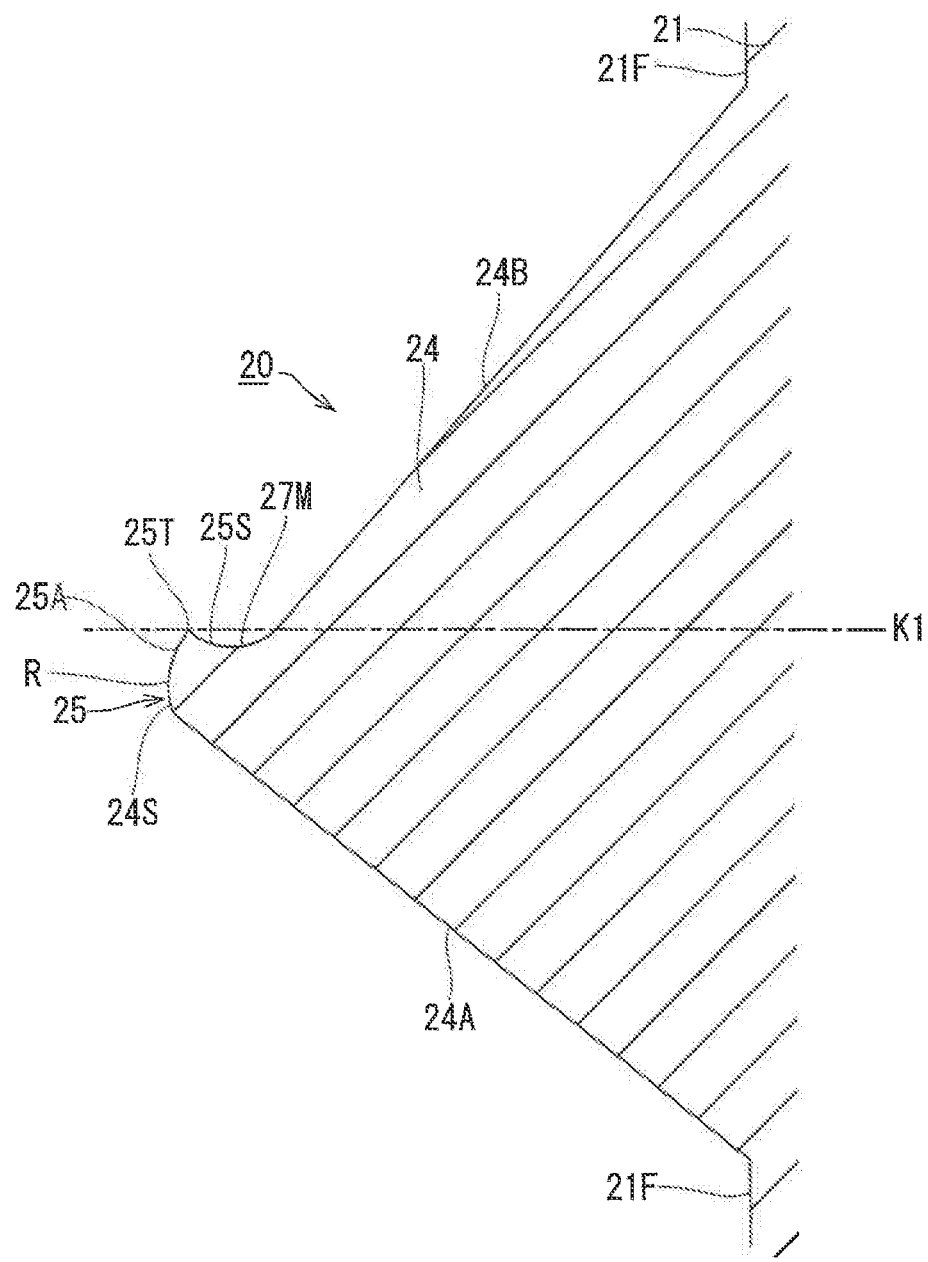
FIG. 7 is a cross-sectional view of the cutting tip taken alone the section plane A-A of FIG. 6.

As shown in FIG. 7, a flank face 25A of the side edge cutting blade 25 curves toward the front as it recedes from the blade edge 25T, then curving slightly toward the rear partway through. Also, the one end portion of the flank face 25A opposite the blade edge 25T is connected to the skirt face 24A. The portion of the flank face 25A of the side edge cutting blade 25 located furthest forward is the edge line R of the angular base portion 24 mentioned above.

A rake face 25S of the side edge cutting blade 25 is formed into a groove shape with a circular arc-shaped cross-section that is depressed with respect to a reference plane K1 that includes the blade edge 25T and is parallel to the central axis J1 of the shaft portion 21, and it is disposed at a position overlapping with the back side of the linearly moving direction of the shaft portion 21 (a central axis J1 direction) with respect to the flank face 25A. One end of the rake fare 25S is contiguous with the skirt face 24B.

Figure 8:
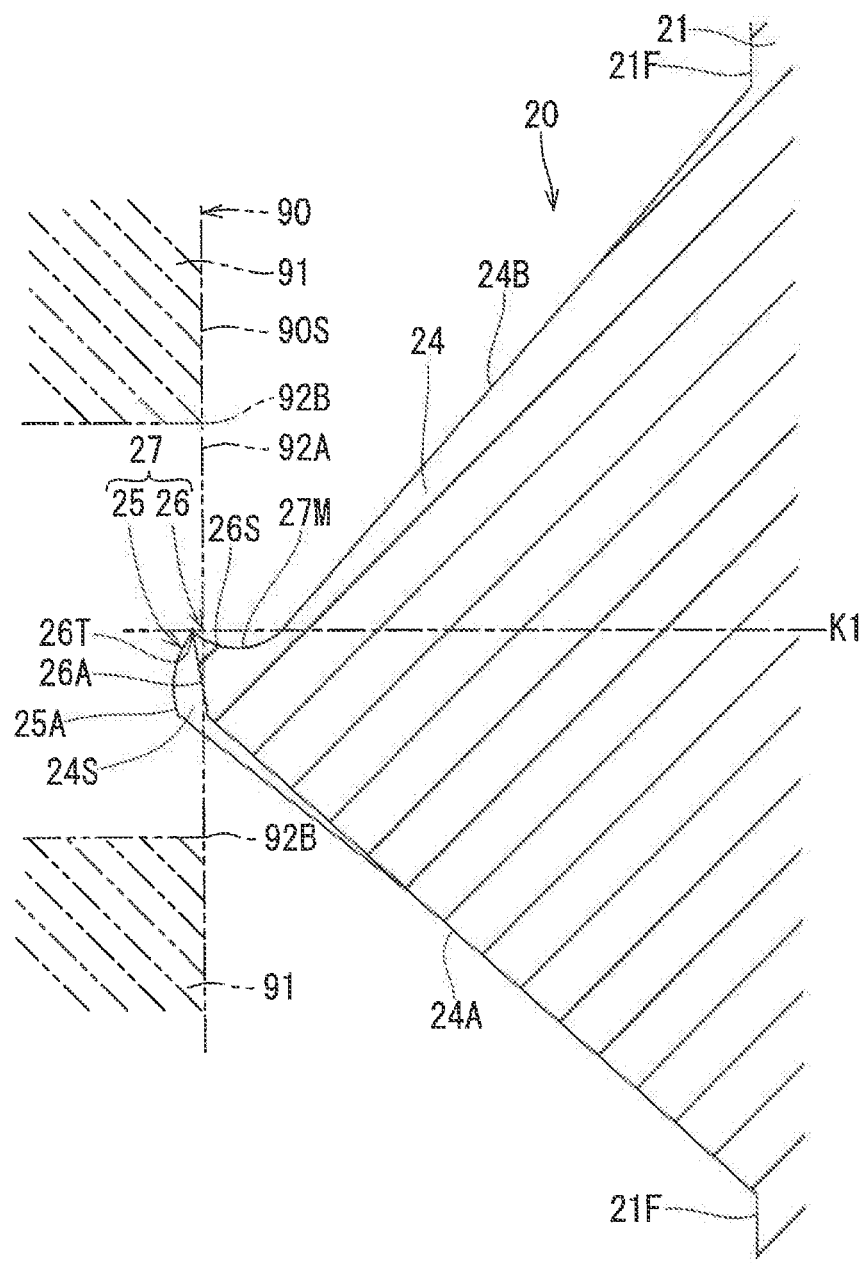
FIG. 8 is a cross-sectional view of the cutting tip taken along the section plane B-B of FIG. 6.

As shown in FIG. 8, the flank face 26A of the bottom edge cutting blade 26 is a flat surface inclined toward the rear as it recedes from the blade edge 26T, and it is connected to the skirt face 24A. That is, the blade edge 26T is the edge line R of the angular base portion 24 in the bottom edge cutting blade 26. Also, a portion of the skirt face 24A that is connected to the flank face 26A of the bottom edge cutting blade 26 has a gentler gradient than a portion connected to the flank face 25A of the side edge cutting blade 25. Furthermore, the rake face 26S of the bottom edge cutting blade 26 is formed into a groove shape with a circular arc-shaped cross-section that is slightly shallower than the rake face 25S of the side edge cutting blade 25, and it is disposed at a position overlapping with a back side of the linearly moving direction of the shaft portion 21 (the central axis J1 direction) with respect to the flank face 26A. The bottom edge cutting blade 26 has a smaller angle of the blade tip (the crossing angle between the flank face 26A and the rake face 26S) than the side edge cutting blade 25. Also, one end of the rake face 26S is contiguous with the skirt face 24B. The flank faces 25A, 26A, the rake faces 25S, 26S and the skirt faces 24A, 24B vary gently near a border portion between the side edge cutting blade 25 and the bottom edge cutting blade 26.

Figure 9:
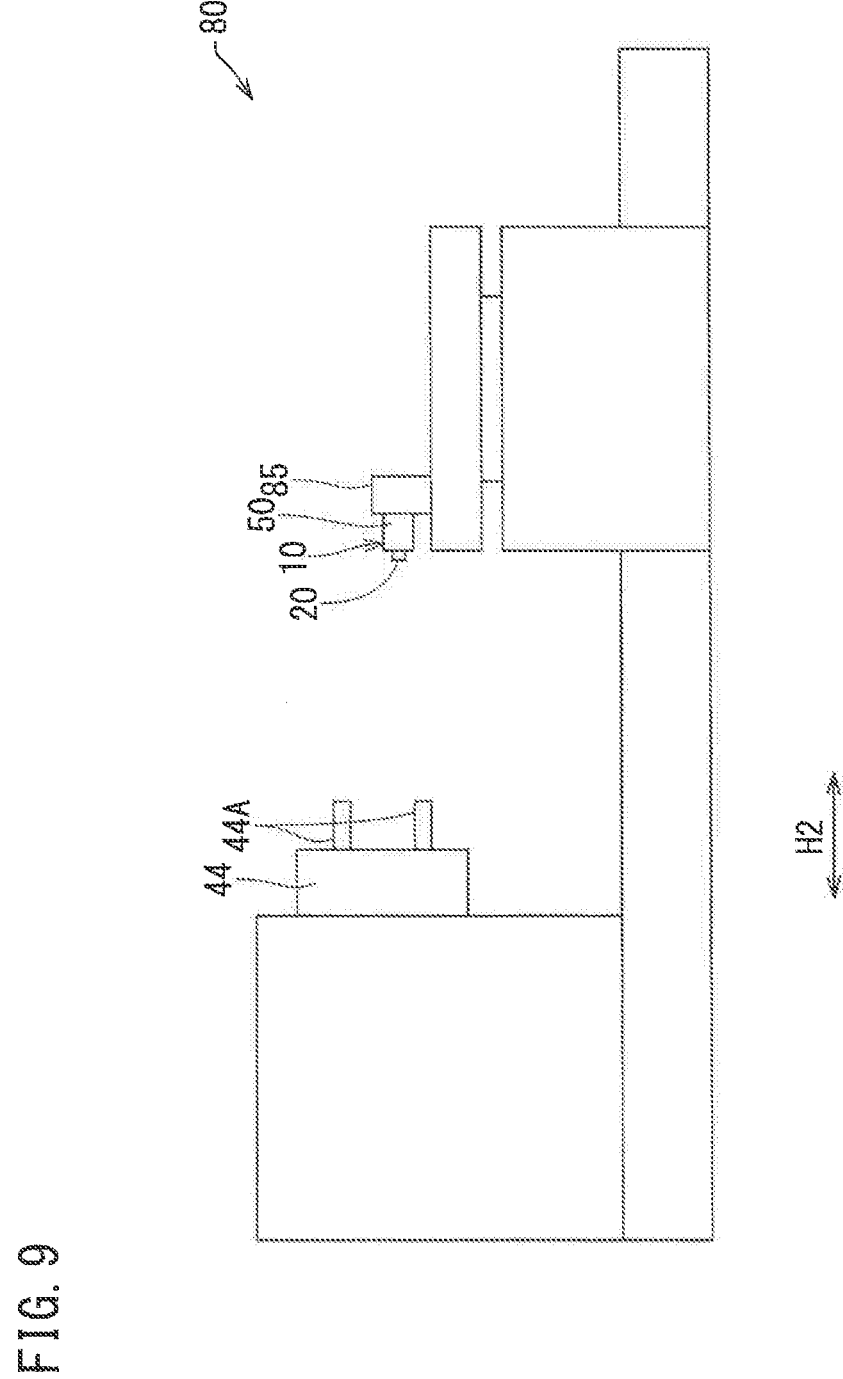
FIG. 9 is a schematic side view of a lathe.
Figure 10:
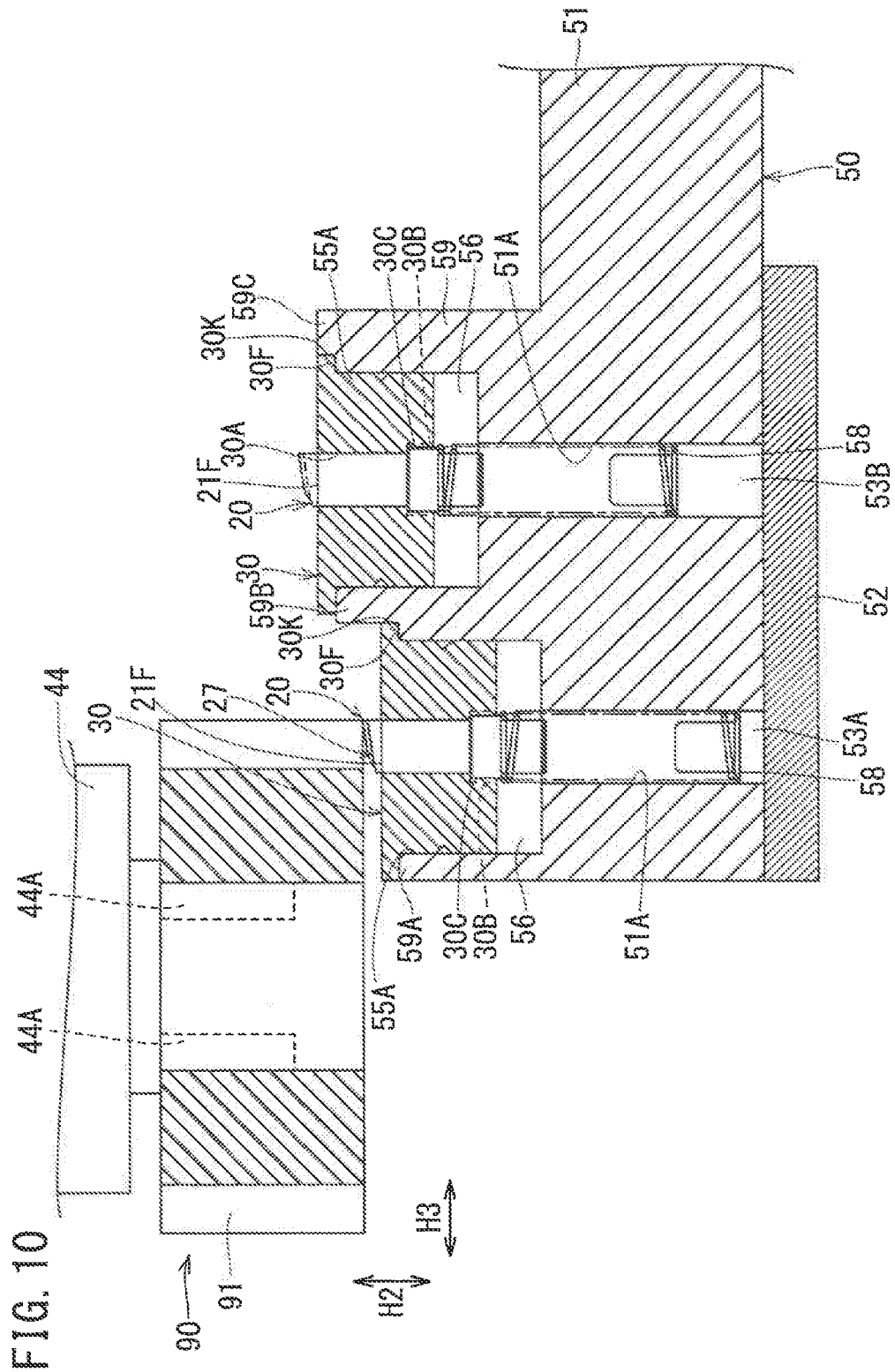
FIG. 10 is a side cross-sectional view of the cutting tool and the gear.

The structure of the cutting tool 10 of the embodiment is as explained above. The operation and the effect of the cutting tool 10 will now be described. The cutting tool 10 is mounted on a lathe 80 (for example, an NC-controlled lathe) and used as depicted in FIG. 9 as an example. Thus, the cutting tool 10 is fixed on the tool holder 85 of the lathe 80, and the toothed wheel 90 is fixed onto a main shaft 44 of the lathe 80 (corresponding to a "gear holding jig" of the present invention). Specifically, a plurality of locking pegs 44A of a chuck of the main shaft 44 of the lathe 80 are opened while inserted inside the toothed wheel 90, or are gripped from the outside of the toothed wheel 90, and as shown in FIG. 10, the toothed wheel 90 is fixed onto the main shaft 44 integrally rotatably. The lathe 80 on which the cutting tool 10 has been mounted corresponds to the "gear edge cut-off device" of the present invention.

On the other hand, as shown in FIG. 9, in the cutting tool 10, a base end of the tip holder 50 is clamped by the tool holder 85, and as shown in FIG. 10, the linearly moving direction of the cutting tips 20, 20 become parallel to the direction of the tooth width H2 of the toothed wheel 90 (that is, a rotation axis direction of the main shaft 44). Furthermore, teaching of the lathe 80 is carried out, for a first point where the cutting tip 20 mounted on the first level 59A of the tip holder 50 is disposed at a "cutting starting position" described below, with respect to the toothed wheel 90, a second point (not shown) where the cutting 20 mounted on the second level 59B of the tip holder 50 is disposed at the cutting starting position with respect to the toothed wheel 90, and a standby point where the cutting tool 10 is separated from the toothed wheel 90.

Figure 11A:
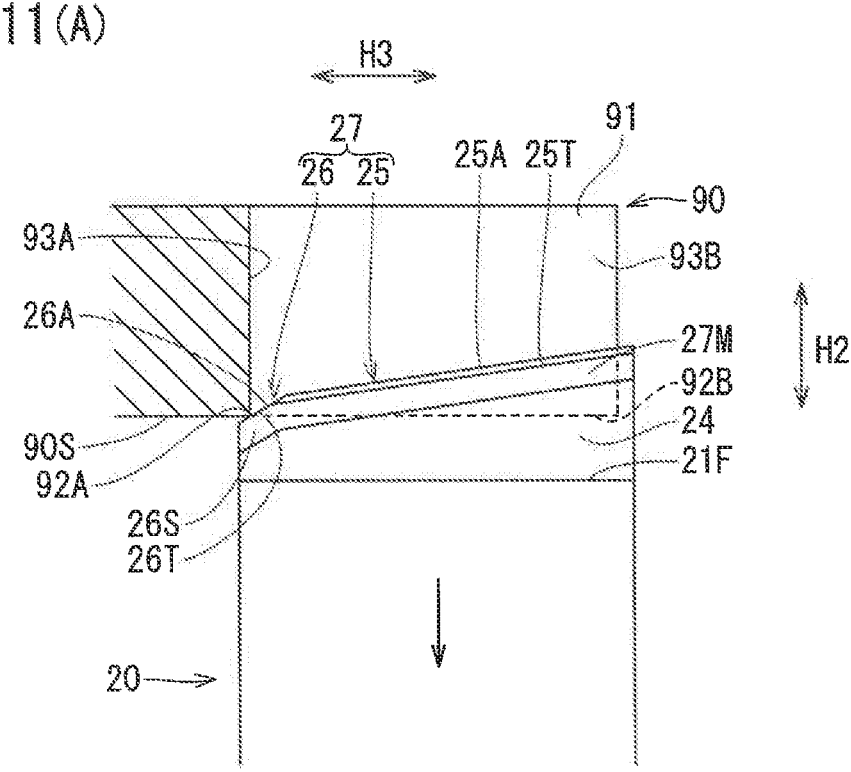
FIG. 11(A) is a side view of a cutting tip cutting off a bottom edge, as seen in a direction of a tooth thickness.

FIG. 1, FIG. 8, FIGS. 11(A) and 11(B) depict the cutting tip 20 disposed at the cutting starting position. In other words, the entire cutting tip 20 is disposed at a side with respect to a central axis of the toothed wheel 90 in the horizontal direction, as shown in FIG. 1, the side edge cutting blade 25 and bottom edge cutting blade 26 of the cutting tip 20 are disposed between adjacent teeth 91, 91, as shown in FIG. 8, and when the bottom edge cutting blade 26 is contacted with the bottom edge 92A of the toothed wheel 90, as shown in FIG. 11(A), the cutting tip 20 becomes disposed at the cutting starting position.

Also, a program is established whereby the cutting tool 10 is moved from the standby point to the first point, and after the toothed wheel 90 has been rotated one or more times in a direction in which each tooth 91 approaches the upward oriented blade section 27 of one cutting tip 20, from above, the cutting tool 10 moves to the second point via the standby point, where the toothed wheel 90 is then rotated one or more times in a direction in which each tooth 91 approaches the downward oriented blade section 27 of the other cutting tip 20, from below.

Figure 11B:
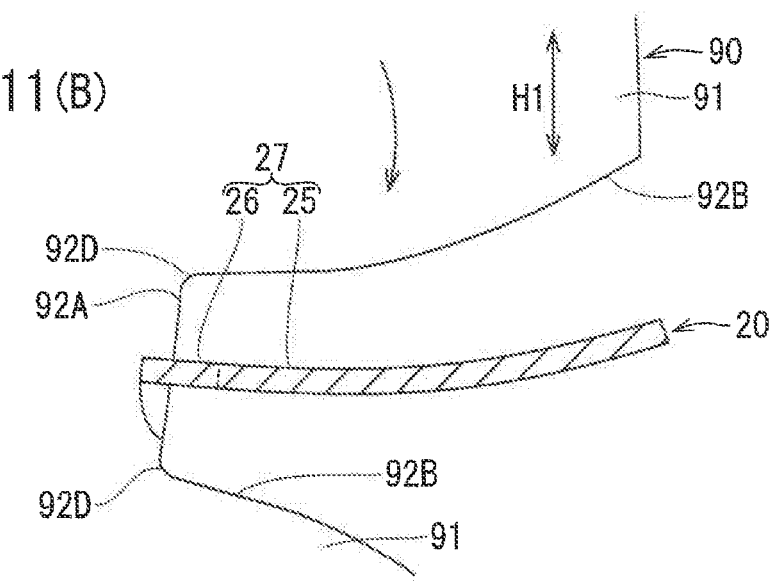
FIG. 11(B) is a side view of the cutting tip cutting off the bottom edge, as seen in the direction of a tooth width.

By teaching/playback of the above-described program, as indicated by the arrow in FIG. 11(B), the toothed wheel 90 rotates in one direction, and the bottom edge cutting blade 26 moves relative to the direction of the tooth thickness H1 and cuts into the bottom edge 92A of the toothed wheel 90. The bottom edge cutting blade 26 then moves to the corner edges 92D while cutting off the bottom edge 92A. Then, the position of the bottom edge cutting blade 26 in contact with the toothed wheel 90 moves to the side edge cutting blade 25 side of the bottom edge cutting blade 26, while the bottom edge cutting blade 26 gradually cones out from between the adjacent teeth 91, 91 in the direction of the tooth width H2

(see FIG. 11(A)), and eventually the side edge cutting blade 25 comes into contact with the side edge 92B.

Figure 12A:
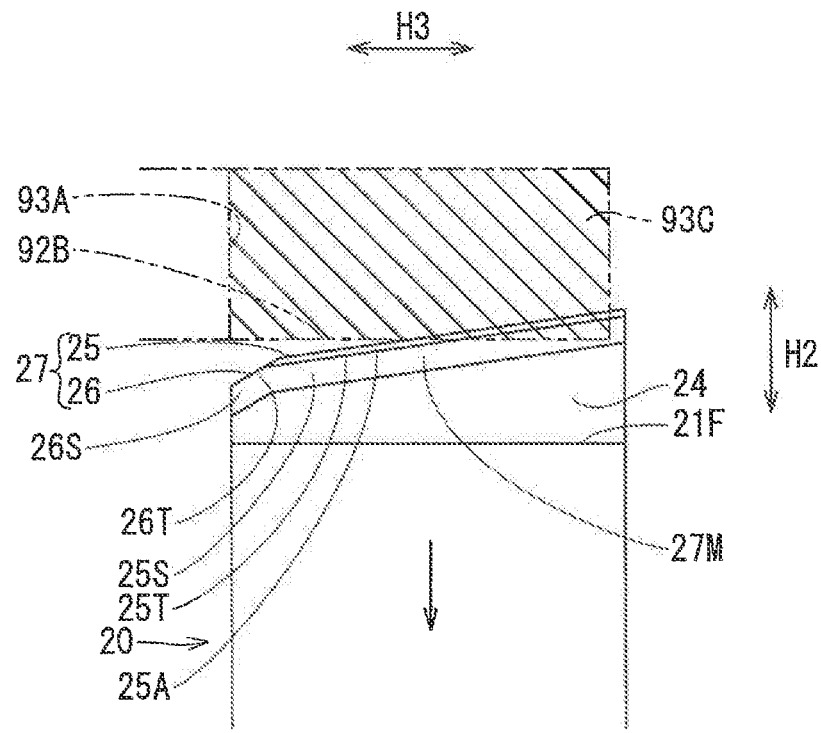
FIG. 12 (A) is a side view of the cutting tip cutting off a side edge, as seen in the direction of the tooth thickness.
FIG. 12(B) is a side view of the cutting tip cutting off the side edge, as seen in the direction of the tooth width.
Figure 12B:
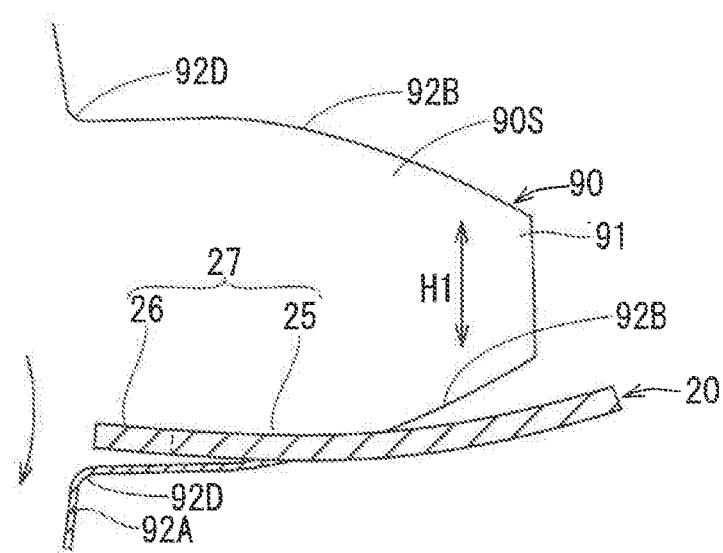

Also, as shown in FIG. 12(B), the blade edge 25T of the side edge cutting blade 25 crosses obliquely with respect to the side edge 92B, as seen in the direction of the tooth width H2, and as shown in FIG. 12(A), the blade edge 25T of the side edge cutting blade 25 becomes crossed obliquely with respect to the side edge 92B, as seen in the direction of the tooth thickness H1 as well. In this state, the side edge cutting blade 25 moves relative to the one direction of the tooth thickness H1 with respect to the tooth 91 and cuts off the side edge 92B from the bottom side to the addendum side, while gradually coming out from between the adjacent teeth 91, 91 in the direction of the tooth width H2.

More specifically, since the flank face 25A of the side edge cutting blade 25 juts out forward from the blade edge 25T (see FIG. 7), the flank face 25A of the side edge cutting blade 25 rides over a surface to be cut formed in the side edge 92B, whereby the cutting position moves from the bottom side of the side edge 92B toward the addendum side, and the side edge cutting blade 25 gradually comes out from between the adjacent teeth 91, 91 in the direction of the tooth width H2. Also, since the flank face 25A has a rounded shape, it makes smooth sliding contact with the face to be cut.

Moreover, when the side edge cutting blade 25 comes out from between the adjacent teeth 91, 91, the flank face 25A of the side edge cutting blade 25 comes into sliding contact with the gear side surface 90S of the toothed wheel 90, and the blade section 27 of the cutting tip 20 projects in between the next adjacent teeth 91, 91, and the same procedure described above is repeated. In this manner, when the toothed wheel 90 is rotated one or more times, the edge from one side edge 92B of each tooth 91 to a portion of the bottom edge 92A is cut off by one cutting tip 20, on one gear side surface 90S of the toothed wheel 90.

The cutting tool 10 then moves to the second point, and the toothed wheel 90 is rotated in an opposite direction. Accordingly, the edge from the other side edge 92B of each tooth 91 of the toothed wheel 90 to the remaining portion of the bottom edge 92A is cut off by the other cutting tip 20. As a result, the bottom edge 92A and the side edge 92B are cut off on the one gear side surface 90S of the toothed wheel 90. If the front and back of the toothed wheel 90 are reversed during mounting on the main shaft 44 and the program is executed, the bottom edge 92A and the side edge 92B of the other gear side surface 90S side of the toothed wheel 90 will be cut off.

As explained above, the cutting tip 20 of the embodiment has the side edge cutting blade 25 on the front end of the shaft portion 21, the flank face 25A of the side edge cutting blade 25 jutting out further forward than the blade edge 25T. With this structure, the cutting tips 20 can be used while supported linearly movably substantially parallel to the direction of the tooth width H2 of the toothed wheel 90, which allows greater ease-of-use of the cutting tips 20 compared to the conventional art and also allows the cutting tips 20 to be supported linearly movably on the tip holder 50, for use as the cutting tool 10 mounted on the lathe 80. Furthermore, a general-purpose lathe 80 can be effectively utilized to cut off the edges of the toothed wheel 90.

Moreover, since the bottom edge cutting blade 26 is provided at one end of the side edge cutting blade 25 in the cutting tip 20 of the embodiment, it is possible to cut off the bottom edges 92A together with the side edges 92S of the teeth 91. In addition, the side edge cutting blade 25 and the bottom edge cutting blade 26 are supported by the angular base portion 24 having a tapered shape which enables to project the side edge cutting blades 25 and the bottom edge cutting blades 26 between the teeth 91, 91. Also, a strength of the side edge cutting blades 25 is increased by the angular base portion 24.

Second Embodiment

The second embodiment is illustrated in FIG. 13 to FIG. 18, and it differs from the first embodiment in that a tip holder 60 holds a single cutting tip 20V including a pair of blade sections 27, 27, and the tip holder 60 slightly tilts the cutting tip 20V in order to properly utilize the blade sections 27, 27. Aspects of the structure that are the same as the first embodiment are indicated by the same reference numerals as the first embodiment and will not be explained again, and the following explanation deals only with the aspects that differ from the first embodiment.

Figure 13:
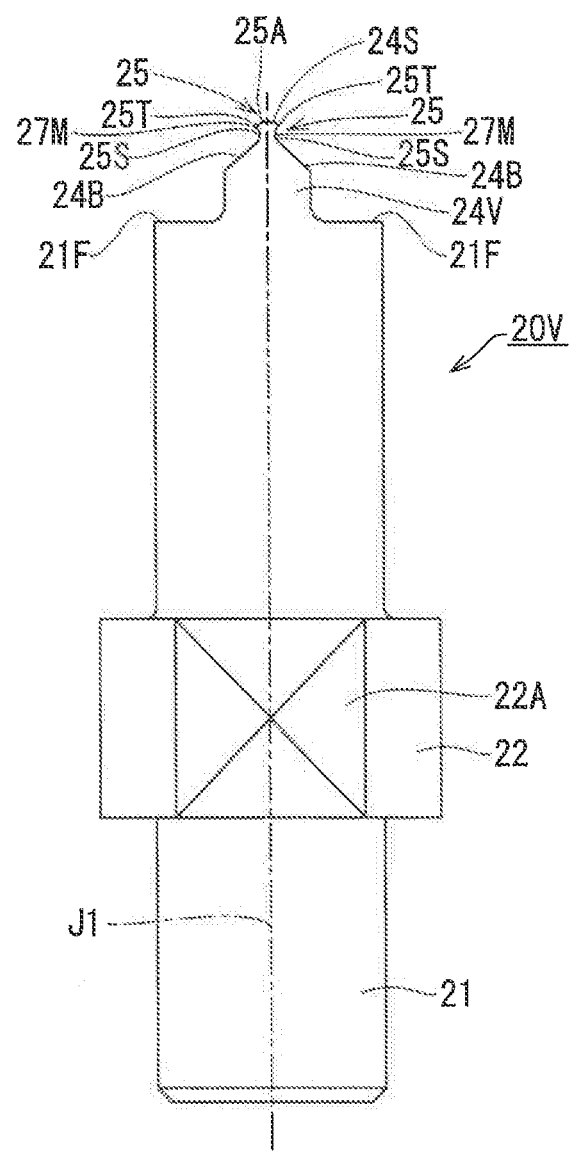
FIG. 13 is a side view of a cutting tip according to a second embodiment of the present invention.
Figure 14:
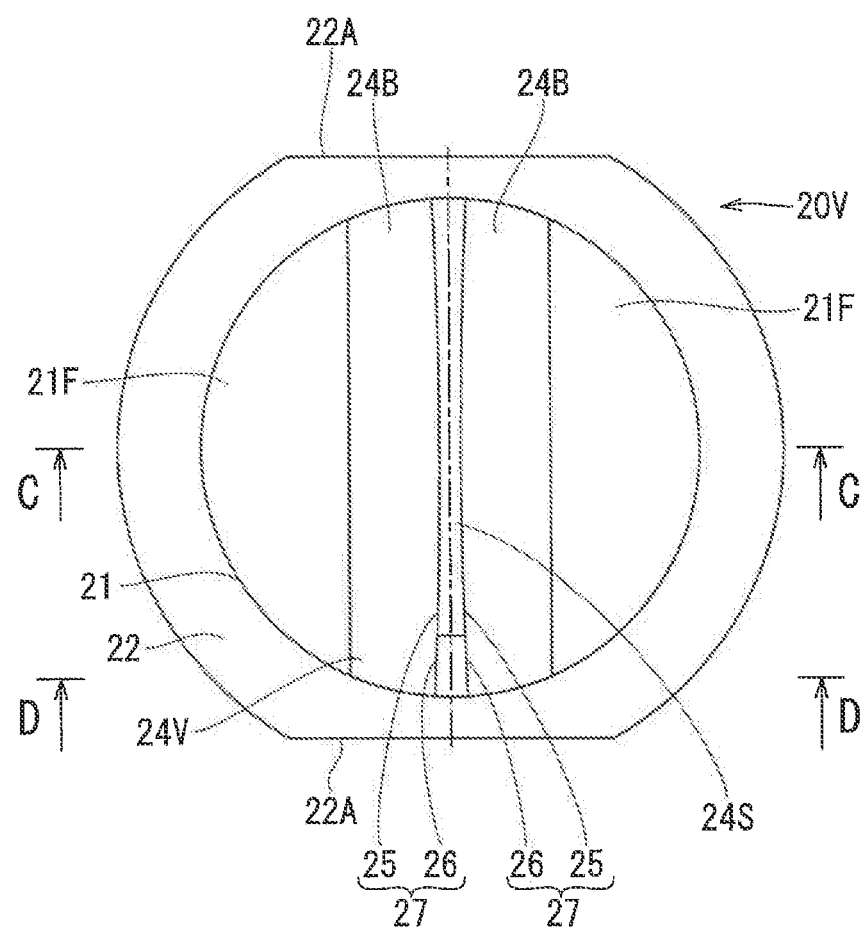
FIG. 14 is a plan view of the cutting tip.
Figure 15A:
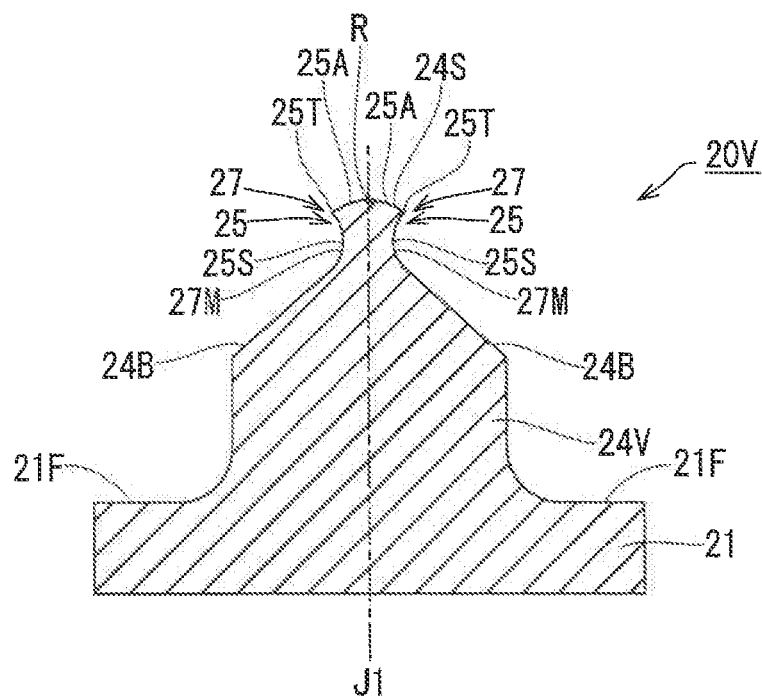
FIG. 15(A) is a cross-sectional view of the cutting tip taken along the section plane C-C of FIG. 14.
Figure 15B:
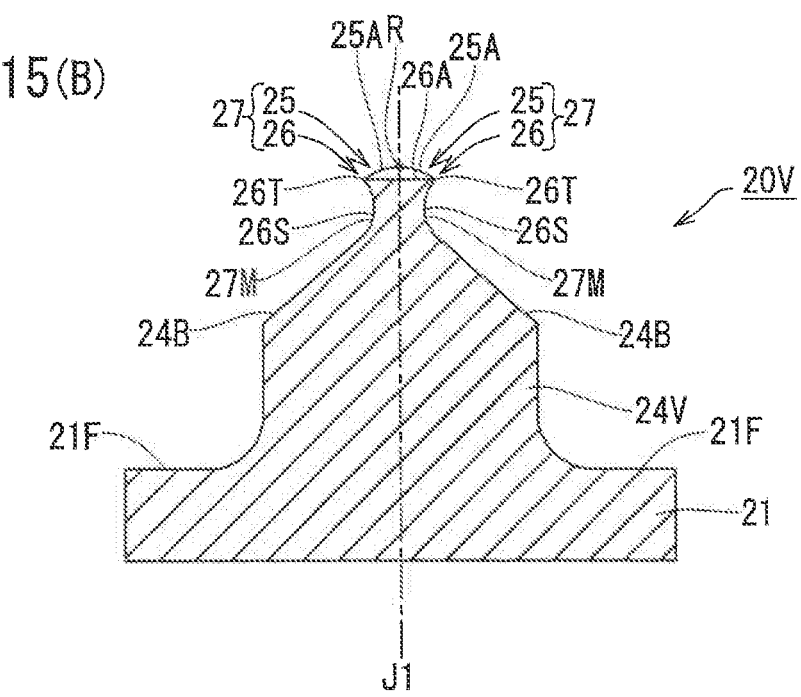
FIG. 15(B) is a cross-sectional view of the cutting tip taken along the section plane D-D of FIG. 14.

Specifically, as shown in FIG. 13, the cutting tip 20V has, in the areas near the ridge portions 24S of the angular base portions 24V of a pair of skirt faces 24B, 24B, the grooves 27M, 27M depressedly formed substantially parallel to the ridge portions 24S, the pair of blade sections 27, 27 having bisymmetry as shown in FIG. 14. Also, as shown in FIG. 15(A), the side edge cutting blade 25 of each blade section 27 has the same shape as the side edge cutting blade 25 of the first embodiment. The bottom edge cutting blade 26 of each blade section 27, however, as shown in FIG. 15(B), differs in that the flank face 26A forms a flat surface connecting between the blade edges 26T, 26T of both bottom edge cutting blades 26, 26, and the rake faces 26S, 26S are slightly deeper compared to the first embodiment.

Figure 16:
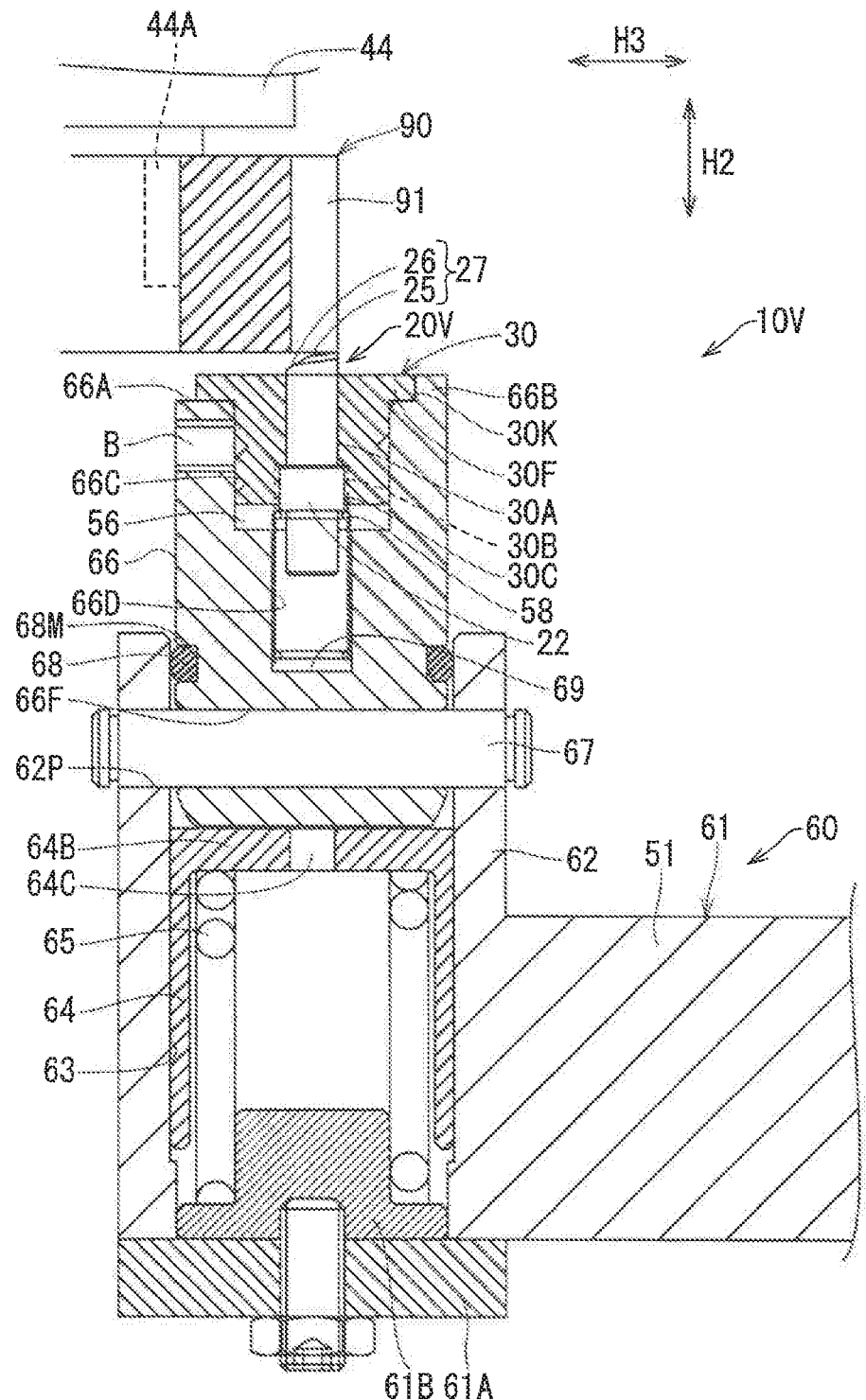
FIG. 16 is a side cross-sectional view of the cutting tool.

As shown in FIG. 16, the tip holder 60 has a structure in which a head portion 66 (corresponding to a "holder head portion" of the present invention) is supported in a tiltable manner by a base portion 61 (corresponding to a "holder base portion" of the present invention). The head portion 66 forms a columnar shape extending in the horizontal direction, and has a fitting hole 66C bored at a center section of a tip end portion, and a spring housing hole 66D bored at a center section of an innermost face of the fitting hole 66C. Also, a guide plug 30 similar to that of the first embodiment is fitted into the fitting hole 66C, and is locked with the bolt B. A step protrusion 66B protrudes outward from an outer edge section of a tip end face 66A of the head portion 66 and the positioning flat surface 30K of the guide plug 30 is engaged with it. The cutting tip 20V is supported linearly movably and unrotatably on the support hole 30A of the guide plug 30, and is forwardly biased by the compression coil spring 58 similarly to the first embodiment. In addition, the cutting tip 20V is held in a state where the ridge portion 24S of the angular base portion 24V extending in the horizontal direction. A pedestal member 69 is provided at the innermost portion of the spring housing hole 66D, allowing the spring force of the compression coil spring 58 to be adjusted by a thickness of the pedestal member 69.

A pinhole 66F passes through at a position near a base end of the head portion 66, in a horizontal direction perpendicular to an axial direction of the head portion 66. In addition, a part of the head portion 66 that is more proximal than the pinhole 66F is slightly narrowed in a tapered manner. On an outer peripheral surface of the head portion 66, there is formed an O-ring groove 68M at a position slightly further toward the tip end side than the pinhole 66F, where an O-ring 68 is received and protrudes from the outer peripheral surface of the head portion 66.

Figure 17:
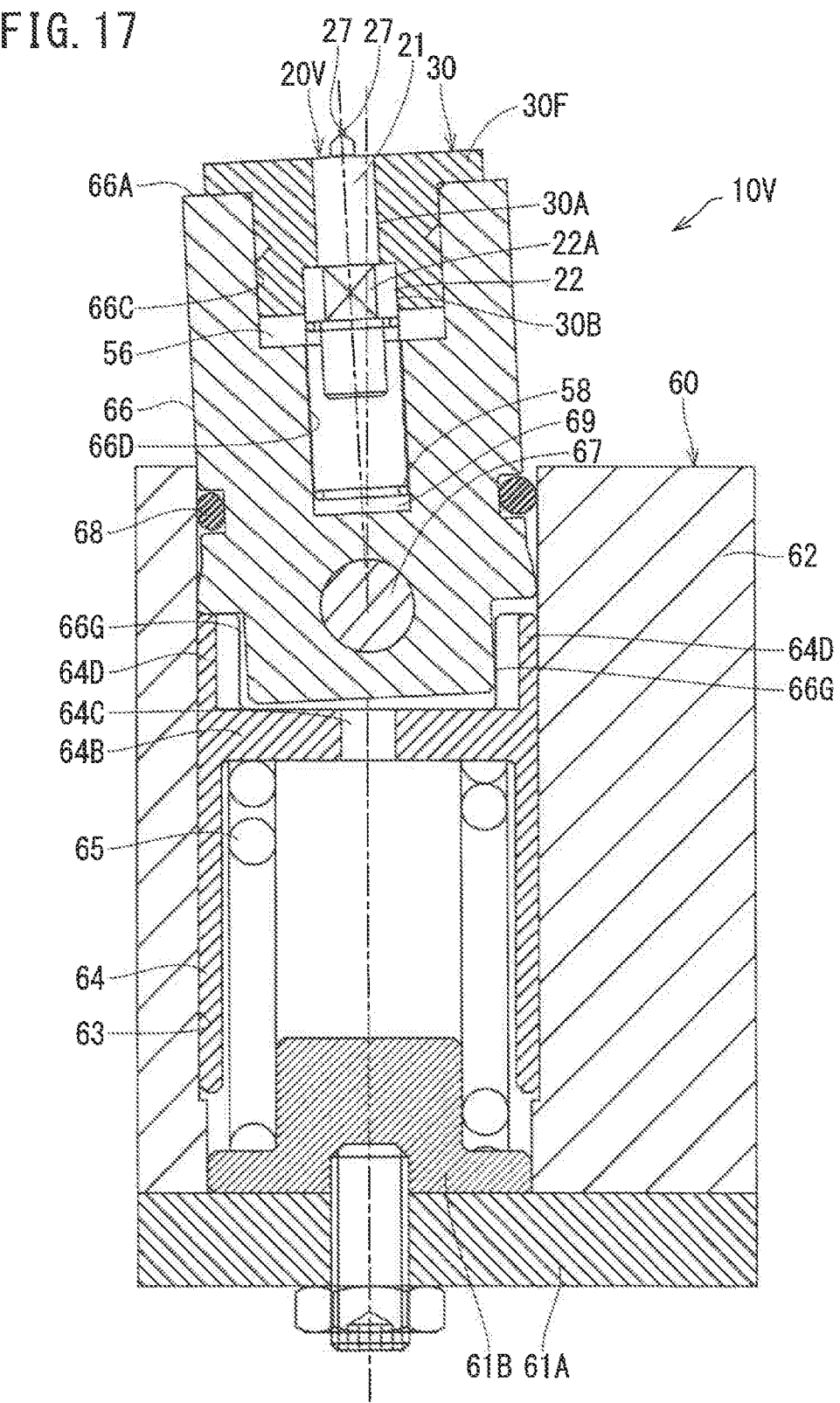
FIG. 17 is a side cross-sectional view with a head portion of the cutting tool in an inclined state.

The base portion 61 forms a shape that a block 62 protrudes to one side from a tip end portion of the square bar portion 51. At the base portion 61, a support hole 63 passes through from a tip end face of the block 62 to an opposite side, and an opening in the support hole 63 opposite against the block 62 is obstructed by a blocking plate 61A. A pinhole 62P runs through at a position near a tip end of the block 62, in a horizontal direction perpendicular to the support hole 63. From the base end of the head portion 66 to the O-ring 68 it is loosely fitted in the support hole 63 from the tip end side of the block 62, and a pin 67 is inserted through the pinholes 62P, 66F. Also, the head portion 66 is usually held centered with respect to the support hole 63 by a compression coil spring 65 described below, and it receives external force and it has a slight vertical tilt with respect to the base portion 61. As shown in FIG. 17, a range of tilt is restricted by contact of part of the head portion 66 with an inner face of the support hole 63. Specifically, the ridge portion 24S of the angular base portion 24V of the cutting tip 20V is restricted so as to tilt in its widthwise direction, in a range that is smaller than the width.

As shown in FIG. 16, a pressing sleeve 64 is fitted deeper into the support hole 63 than the head portion 66. The pressing sleeve 64 has a cylindrical body whose one end is blocked by a bottom wall 64B, and is supported in the support hole 63 linearly movingly, with the bottom wall 64B in contact the base end face of the head portion 66. Also, as shown in 17, an insertion hole 64C is formed at the center section of the bottom wall 64B, with colliding protrusions 64D, 64D protruding upward from a pair of opposite positions on an outer edge section of the bottom wall 64B. At the base end of the head portion 66 there are formed recesses 66G, 66G that receive the colliding protrusions 64D, 64D. When the head portion 66 has been tilted, tip end faces of the colliding protrusions 64D collide with inner faces of the recesses 66G.

Also, a compression coil spring 65 is accommodated inside the pressing sleeve 64, in a stretched state between the bottom wall 64B and the blocking plate 61A. A positioning protrusion 61B protrudes from the blocking plate 61A toward the pressing sleeve 64, being fitted to an inner side of an end portion of the compression coil spring 65. Thus, an end face of the pressing sleeve 64 and the end face of the head portion 66 are usually in face-contact with each other so that the head portion 66 is held in a horizontal posture centered in the support hole 63.

The structures of the cutting tip 20V and cutting tool 10V of the embodiment are as explained above. Their operations and effects will now be described. The cutting tool 10V is mounted on the tool holder 85 of the lathe 80 (see FIG. 9) in the same manner as the cutting tool 10 of the first embodiment. It is used to cut off the edges of the toothed wheel 90 mounted on the main shaft 44 of the lathe 80.

Specifically, as shown in FIG. 16. The head portion 66 is set in a horizontal posture, in such a manner that the linearly moving direction of the cutting tip 20V and the direction of the tooth width H2 of the toothed wheel 90 are parallel. Next, a part of the ridge portion 24S of the angular base portion 24V corresponding to the bottom edge cutting blade 26 is pressed against the bottom edge 92A of the toothed wheel 90, to teach the lathe 80 a first point where the cutting tip 20V is slightly pressed into the support hole 30A and the standby point where the cutting tip 20V is separated from the toothed wheel 90. A program is established whereby the cutting tool 10 moves from the standby point to the first point, and after the toothed wheel 90 is rotated one or more times in one direction, the toothed wheel 90 is rotated one or more times in the other direction.

Figure 18A:
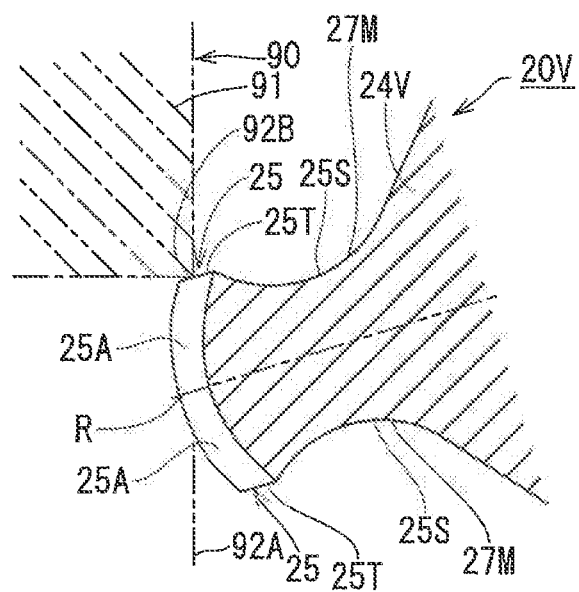
FIG. 18(A) is a side cross-sectional view showing one side edge cutting blade being used.

By teaching/playback of the program, the toothed wheel 90 rotates in one direction, the cutting tip 20V is pressed downward by the toothed wheel 90 to a downwardly inclined first tilting posture, and the upper blade section 27 is disposed exactly at the "cutting starting position" with respect to the toothed wheel 90, as explained in the first embodiment. Here, as shown in FIG. 18(A), the part of the ridge portion 24S of the angular base portion 24V that is further above can the edge line R (the line at the center in the widthwise direction of the ridge portion 24S), i.e. the flank face 25A of the side edge cutting blade 25 at an upper end of the blade section 27, in a disposed state further toward the toothed wheel 90 end than the blade edge 25T at an upper end of the side edge cutting blade 25. Thus, when the toothed wheel 90 is rotated in one direction, the edge from the one side edge 92B of each tooth 91 to the portion of the bottom edge 92A is cut off by one cutting tip 20, on one gear side surface 90S of the toothed wheel 90, similarly to the first embodiment.

Figure 18B:
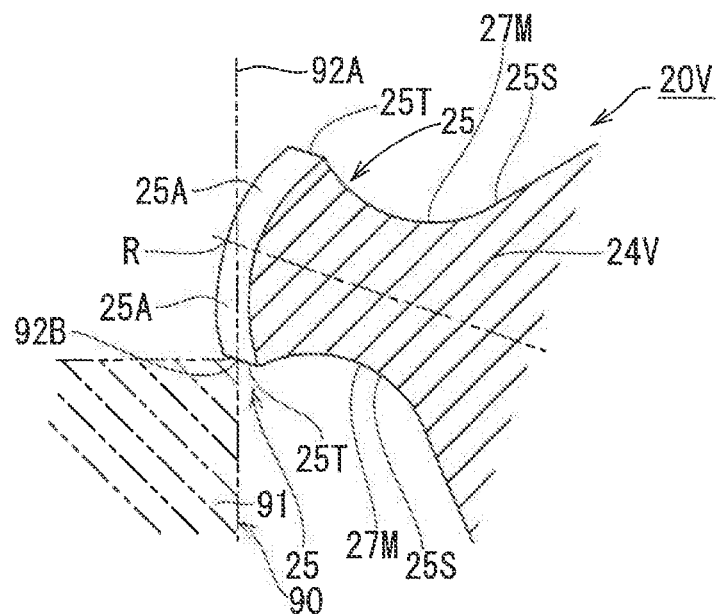
FIG. 18(B) is a side cross-sectional view showing the other side edge cutting blade being used.

When the toothed wheel 90 then rotates in the other direction, the cutting tip 20V is pressed upward by the toothed wheel 90 to an upwardly inclined second tilting posture, and the lower blade section 27 is disposed at the cutting starting position with respect to the toothed wheel 90. Here, as shown in FIG. 18(B), the part of the ridge portion 24S of the angular base portion 24V that is further below than the edge line R (the line at the center in the widthwise direction of the ridge portion 24S), i.e. the flank face 25A of the side edge cutting blade 25 at the lower end of the blade section 27, in a disposed state further toward the toothed wheel 90 end than the blade edge 25T at the lower end of the side edge cutting blade 25. As a result, when the toothed wheel 90 rotates in the other direction, the other side edge 92B and an edge of the remaining portion of the bottom edge 92A of each tooth 91 are cut off. Thus, the same operations and effects are exhibited by this embodiment as by the first embodiment.

Other Embodiments

The present invention is not limited to the embodiments described above, and for example, the following embodiments are included within the technical scope of the invention, while other various modifications may also be implemented so long as the gist of the invention is maintained.

(1) In each of the embodiments described above, a spur gear is used as an example of a subject work for edge removal by the cutting tool, but the workpiece may instead be a helical gear (where the direction of the tooth width is inclined with respect to the rotation axis direction). Alternatively, instead of a gear, the workpiece for edge removal by the cutting tool may be any one having a convex-concave shape, such as a rack or sprocket, or a pulley.

(2) In each of the embodiments described above, the structure included a bottom edge cutting blade 26, but it may instead have only a side edge cutting blade 25.

(3) In the second embodiment, the head portion 66 was biased in the horizontal position by the compression coil spring 65 and the pressing sleeve 64, but the structure may instead be one without the compression coil spring 65 and pressing sleeve 64. This will allow tilting and further downsizing.

DESCRIPTION OF THE REFERENCE NUMERAL 10, 10V Cutting tools
20, 20V Cutting tips

21 Shaft portion
24, 24V Angular base portions
24A, 24B Skirt faces
24S Ridge portion
25 Side edge cutting blade (cutting blade)
25A, 26A Flank faces
25S, 26S Rake faces
25T, 26T Blade edges
26 Bottom edge cutting blade (bottom cutting blade)
27M Groove
30 Guide plug
30A Support hole
50, 60 Tip holders
58 Compression coil spring (biasing means)
61 Base portion (holder base portion)
66 Head portion (holder head portion)
80 Lathe (gear edge cut-off device)
90 Toothed wheel (gear)
91 Tooth
K1 Reference plane
R Edge line

What is claimed is:

1. A cutting tip having a cutting blade that advances and retracts between adjacent teeth of a gear in a direction of a tooth width, and is contacted in an obliquely crossing state to side edges of the teeth as viewed in a direction of a tooth thickness, wherein relative movement in the direction of the tooth thickness causes retraction from between the teeth while the side edges are cut off,
   the cutting tip comprising:
   a shaft portion supported linearly movably and forwardly biased in a linearly moving direction;
   an angular base portion provided at a front end of the shaft portion and having a pair of skirt faces that are mutually separated toward a rear and a ridge portion that extends obliquely with respect to the linearly moving direction;
   a groove depressed near the ridge portion of the skirt face and extending substantially parallel to the ridge portion;
   a blade edge provided on the cutting blade and positioned on a border line between the ridge portion and the groove;
   a rake face provided on the cutting blade and positioned further toward the groove side than the blade edge; and
   a flank face provided on the cutting blade and positioned further toward the ridge portion side than the blade edge, that juts out forward as it separates from the blade edge.

2. The cutting tip according to claim 1,
   wherein the blade edge is curved into a recessed state as viewed in the linearly moving direction.

3. The cutting tip according to claim 1,
   wherein the rake face is depressed with respect to a reference plane including the blade edge and being parallel to the linearly moving direction.

4. The cutting tap according to claim 1, further comprising:
   a bottom cutting blade that has the blade edge that extends in a curving manner from a back side end of the blade edge of the cutting blade to an oblique back side, and cuts off an edge at bottom of the gear; and
   the flank face of the bottom cutting blade is disposed either at a same position as the blade edge of the bottom cutting blade, or further toward the rear.

5. The cutting tip according to claim 1,
   wherein the groove and the cutting blade are provided bisymmetrically on both sides of the ridge portion.

6. The cutting tip according to claim 1,
   wherein the ridge portion of the angular base portion curved in a widthwise direction and bulges forward.

7. A cutting tool comprising:
   the cutting tip according to claim 1,
   a tip holder having a support hole in which the shaft portion of the cutting tip is fitted linearly movably and unrotatably, and mounted on a tool holder of a lathe; and
   biasing means that forwardly biases the cutting tip in the linearly moving direction.

8. The cutting tool comprising:
   the cutting tip according to claim 2,
   a tip holder having a support hole in which the shaft portion of the cutting tip is fitted linearly movably and unrotatably, and mounted on a tool holder of a lathe; and
   biasing means that forwardly biases the cutting tip in the linearly moving direction.

9. The cutting tool comprising:
   the cutting tip according to claim 3,
   a tip holder having a support hole in which the shaft portion of the cutting tip is fitted linearly movably and unrotatably, and mounted on a tool holder of a lathe; and
   biasing means that forwardly biases the cutting tip in the linearly moving direction.

10. The cutting tool comprising:
    the cutting tip according to claim 4,
    a tip holder having a support hole in which the shaft portion of the cutting tip is fitted linearly movably and unrotatably, and mounted on a tool holder of a lathe; and
    biasing means that forwardly biases the cutting tip in the linearly moving direction.

11. The cutting tool comprising:
    the cutting tip according to claim 5,
    a tip holder having a support hole in which the shaft portion of the cutting tip is fitted linearly movably and unrotatably, and mounted on a tool holder of a lathe; and
    biasing means that forwardly biases the cutting tip in the linearly moving direction.

12. The cutting tool comprising:
    the cutting tip according to claim 6,
    a tip holder having a support hole in which the shaft portion of the cutting tip is fitted linearly movably and unrotatably, and mounted on a tool holder of a lathe; and
    biasing means that forwardly biases the cutting tip in the linearly moving direction.

13. The cutting tool according to claim 7,
    wherein the tip holder has:
    a holder base portion mounted on the tool holder of the lathe; and
    a holder head portion having the support hole and being supported in a tiltable manner on the holder base portion,
    wherein a tilting range of the holder head portion with respect to the holder base portion is restricted so that the ridge portion of the angular base portion of the cutting tip tilts in its widthwise direction within a range that is less than its width.

14. The cutting tool according to claim 8,
    wherein the tip holder has:
    a holder base portion mounted on the tool holder of the lathe; and a holder head portion having the support hole and being supported in a tiltable manner on the holder base portion, wherein a tilting range of the holder head portion with respect to the holder base portion is restricted so that the ridge portion of the angular base portion of the cutting tip tilts in its widthwise direction within a range that is less than its width.

15. The cutting tool according to claim 9, wherein the tip holder has:

a holder base portion mounted on the tool holder of the lathe; and a holder head portion having the support hole and being supported in a tiltable manner on the holder base portion, wherein a tilting range of the holder head portion with respect to the holder base portion is restricted so that the ridge portion of the angular base portion of the cutting tip tilts in its widthwise direction within a range that is less than its width.

16. The cutting tool according to claim 10, wherein the tip holder has:

a holder base portion mounted on the tool holder of the lathe; and a holder head portion having the support hole and being supported in a tiltable manner on the holder base portion, wherein a tilting range of the holder head portion with respect to the holder base portion is restricted so that the ridge portion of the angular base portion of the cutting tilts in its widthwise direction within a range that is less than its width.

17. The cutting tool according to claim 11, wherein the tip holder has:

a holder base portion mounted on the tool holder of the lathe; and a holder head portion having the support hole and being supported in a tiltable manner on the holder base portion, wherein a tilting range of the holder head portion with respect to the holder base portion is restricted so that the ridge portion of the angular base portion of the cutting tip tilts in its widthwise direction within a range that is less than its width.

18. The cutting tool according to claim 12, wherein the tip holder has:

a holder base portion mounted on the tool holder of the lathe; and a holder head portion having the support hole and being supported in a tiltable manner on the holder base portion, wherein a tilting range of the holder head portion with respect to the holder base portion is restricted so that the ridge portion of the angular base portion of the cutting tip tilts in its widthwise direction within a range that is less than its width.

19. A gear edge cut-off device comprising:

the cutting tool according to claim 7, and a gear holding jig that holds a toothed wheel as the gear rotatably.

20. The gear edge cut-off device comprising:

the cutting tool according to claim 13, and a gear holding jig that holds a toothed wheel as the gear rotatably.

* * * * *